US011482049B1

(12) United States Patent
Kvochko et al.

(10) Patent No.: US 11,482,049 B1
(45) Date of Patent: Oct. 25, 2022

(54) MEDIA VERIFICATION SYSTEM

(71) Applicant: Bank of America Corporation, Charlotte, NC (US)

(72) Inventors: Elena Kvochko, New York, NY (US); George A. Albero, Charlotte, NC (US); Daniel Joseph Serna, The Colony, TX (US); Michael Emil Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 234 days.

(21) Appl. No.: 16/847,962

(22) Filed: Apr. 14, 2020

(51) Int. Cl.
| *G06K 9/00* | (2022.01) |
| *G06V 40/40* | (2022.01) |
| *G06K 9/62* | (2022.01) |
| *H04W 4/12* | (2009.01) |
| *G06N 20/00* | (2019.01) |
| *G06V 40/20* | (2022.01) |

(52) U.S. Cl.
CPC ........... *G06V 40/40* (2022.01); *G06K 9/6221* (2013.01); *G06K 9/6257* (2013.01); *G06N 20/00* (2019.01); *G06V 40/23* (2022.01); *H04W 4/12* (2013.01)

(58) Field of Classification Search
CPC ...... G06V 40/40; G06V 40/23; G06K 9/6221; G06K 9/6257; G06N 20/00; H04W 4/12
See application file for complete search history.

(56) References Cited

U.S. PATENT DOCUMENTS

| 5,842,191 A | 11/1998 | Stearns |
| 9,659,185 B2 | 5/2017 | Elovici et al. |
| 10,262,236 B2 | 4/2019 | Lim et al. |
| 10,860,836 B1 * | 12/2020 | Tyagi ..................... G06K 9/627 |
| 2004/0131254 A1 | 7/2004 | Liaug et al. |
| 2007/0011711 A1 | 1/2007 | Wolf et al. |
| 2011/0317009 A1 | 12/2011 | Kumaraswamy et al. |
| 2014/0250457 A1 | 9/2014 | Ramaswamy |
| 2015/0256835 A1 | 9/2015 | Sakai |
| 2015/0297949 A1 * | 10/2015 | Aman ..................... G06T 7/246 |
| | | 348/157 |

(Continued)

OTHER PUBLICATIONS

Li, Yuezun et al., "In Ictu Oculi: Exposing AI Created Fake Videos by Detecting Eye Blinking." 2018 IEEE International Workshop on Information Forensics and Security (WIFS). IEEE, 2018.*

(Continued)

*Primary Examiner* — Samir A Ahmed (57) ABSTRACT

A media verification device receives baseline media, which includes videos confirmed to include a target subject. The device determines, based on the baseline media for the target subject, a set of baseline features associated with the target subject. A baseline profile is determined for the target subject based on the set of baseline features. When test media which includes a video purported to include the test subject is received, test features are determined for the test media. A test profile is determined for the test media based on the set of test features. The test profile is compared to the baseline profile for the test subject. Based on this comparison, a confidence score is determined. If the confidence score is not greater than a threshold value, the test media is determined to include a synthetic video of the target subject, and an alert is provided.

20 Claims, 5 Drawing Sheets

(56) References Cited

U.S. PATENT DOCUMENTS

| | | |
|---|---|---|
| 2016/0004914 A1 | 1/2016 | Park |
| 2016/0019426 A1 | 1/2016 | Tusch et al. |
| 2017/0185829 A1 | 6/2017 | Walsh et al. |
| 2017/0223310 A1 | 8/2017 | Farrell et al. |
| 2017/0311863 A1 | 11/2017 | Matsunaga |
| 2018/0114017 A1 | 4/2018 | Leitner et al. |
| 2018/0225518 A1 | 8/2018 | Gu et al. |
| 2018/0268222 A1 | 9/2018 | Sohn et al. |
| 2018/0316890 A1 | 11/2018 | Farrell et al. |
| 2018/0341878 A1 | 11/2018 | Azout et al. |
| 2019/0029528 A1 | 1/2019 | Tzvieli et al. |
| 2019/0046044 A1 | 2/2019 | Tzvieli et al. |
| 2019/0052839 A1 | 2/2019 | Farrell et al. |
| 2019/0073523 A1 | 3/2019 | Lee et al. |
| 2019/0122072 A1 | 4/2019 | Cricri et al. |
| 2019/0147333 A1 | 5/2019 | Kallur Palli Kumar et al. |
| 2019/0164173 A1 | 5/2019 | Liu et al. |
| 2019/0179861 A1 | 6/2019 | Goldenstein et al. |
| 2019/0197670 A1* | 6/2019 | Ferrer ............... G06K 9/6272 |
| 2019/0213720 A1 | 7/2019 | Urashita |
| 2019/0213721 A1 | 7/2019 | Urashita |
| 2019/0236614 A1 | 8/2019 | Burgin et al. |
| 2019/0258870 A1 | 8/2019 | Kundu et al. |
| 2019/0278378 A1 | 9/2019 | Yan et al. |
| 2019/0282208 A1* | 9/2019 | Silberman ............. A61B 8/468 |
| 2019/0290127 A1 | 9/2019 | Hanina et al. |
| 2019/0290129 A1 | 9/2019 | Hanina et al. |
| 2019/0303655 A1 | 10/2019 | Werner et al. |
| 2019/0313915 A1 | 10/2019 | Tzvieli et al. |
| 2019/0349613 A1 | 11/2019 | Pikes et al. |
| 2019/0355128 A1 | 11/2019 | Grauman et al. |
| 2020/0074183 A1 | 3/2020 | Altuev |
| 2020/0092301 A1 | 3/2020 | Coffing |
| 2020/0160502 A1* | 5/2020 | Nießner ............... G06T 7/0002 |
| 2020/0302609 A1* | 9/2020 | Rong ................... G06T 7/248 |
| 2021/0042529 A1* | 2/2021 | Price ................... G06V 20/46 |
| 2021/0142065 A1* | 5/2021 | Price ................... G06V 20/41 |
| 2021/0209256 A1* | 7/2021 | Bates .................. G06V 20/46 |
| 2021/0209388 A1* | 7/2021 | Ciftci .................. G06V 40/40 |
| 2022/0070295 A1* | 3/2022 | Shah .................. H04M 3/493 |

OTHER PUBLICATIONS

Agarwal, Shruti et al., "Protecting World Leaders Against Deep Fakes", In CVPR workshops Jun. 16, 2019 (vol. 1).*

"Micro Expressions." *Paul Elkman Group LLC* website. https://www.paulekman.com/resources/micro-expressions/ 2020.

* cited by examiner

MEDIA VERIFICATION SYSTEM

TECHNICAL FIELD

The present disclosure relates generally to synthetic media. More particularly, in certain embodiments, the present disclosure is related to a media verification system.

BACKGROUND

Synthetic media, such as so called "deep fake" videos, can be generated to mislead media consumers. For instance, a video of an individual speaking can be edited or generated to make it appear as though a person has spoken words that her/she did not actually speak. Other types of media can be similarly edited or created to generate synthetic images of events that have not occurred and/or to generate synthetic audio of words a speaker did not actually speak.

SUMMARY

In an embodiment, a system includes a media server configured to store baseline media for a target subject. The baseline media includes videos confirmed to include the target subject. The system includes a media verification device with a network interface coupled to the media server and configured to receive the baseline media. The media verification device includes a processor coupled to the network interface. The media verification device determines, based on the baseline media for the target subject, a set of baseline features associated with the target subject. The baseline features correspond to characteristics of the target subject presented in the baseline media. A baseline profile is determined for the target subject based on the set of baseline features. The baseline profile includes for each baseline feature of the set of baseline features a corresponding range of values associated with the feature for the target subject. When test media which includes a video purported to include the test subject is received, test features are determined for the test media. The test features correspond to characteristics of the target subject presented in the test media. A test profile is determined for the test media based on the set of test features. The test profile includes at least a portion of the determined test features. The test profile is compared to the baseline profile for the test subject. Based on the comparison of the test profile to the baseline profile for the test subject, a confidence score is determined for the test media. The confidence score includes a probability that the test media includes synthetic media. In response to determining that the confidence score is greater than a threshold value, the video of the test media is determined to be a real video of the target subject. In response to determining that the confidence score is not greater than the threshold value, the test media is determined to include a synthetic video of the target subject, and an alert identifying the test media as synthetic media is provided.

Synthetic media is becoming increasingly realistic and difficult to recognize. Previous technology is generally incapable of reliably and efficiently detecting synthetic media. This disclosure encompasses the recognition that most people display certain features (e.g., associated with the rate of blinking and/or the use of certain gestures, expressions, words, etc.) that are within a certain characteristic range of values and that synthetic media often fails to accurately recreate these features. As such, measurements of these features can be compared to expected baseline feature values (e.g., for a particular person, group of people, and/or for people in general) to more reliably detect synthetic media than was possible using previous technology. For instance, an average person may tend to blink at a certain rate (e.g., 15 to 20 times per minute), but synthetic media may fail to show blinking at this relatively rapid rate. A synthetic video of an individual may present the individual blinking less than ten times per minute or even not blinking at all.

Certain embodiments of this disclosure provide unique solutions to technical problems of previous systems for detecting synthetic media by providing a media verification system. For example, the disclosed system provides several technical advantages which include 1) the reliable detection of synthetic media that displays features that do not correspond to established baseline features of subjects appearing in the media; 2) more efficient review of media by decreasing the time and resources required to review each media entry; and 3) the generation and provision of appropriate alerts to inform users that they may be consuming synthetic media. As such, this disclosure may improve the function of computer systems used to present media, detect synthetic media, and/or report any suspected synthetic media. For example, the system described in this disclosure may decrease processing resources required to review media and improve the reliability of results. The system may also or alternatively reduce or eliminate practical and technical barriers to reviewing large amounts of media (e.g., available via a network for consumption by users). The system described in this disclosure may particularly be integrated into a practical application for evaluating media that is attributed to a particular target subject (e.g., a public figure) for whom baseline features are established to reliably and efficiently detect and report any synthetic media purporting to show the target subject (e.g., before any damage to the subject's reputation).

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for reliably detecting synthetic media. The system described in this disclosure solves the technical problems of previous technology by detecting synthetic media based on measurable features of subjects (e.g., people) displayed in the media. The system facilitates a customizable approach to automatically reviewing media, determining a likelihood that the media is synthetic, and automatically reporting results to appropriate users. Features which may be measured to detect synthetic media may include semi-autonomic features (e.g., features associated with breathing, blinking, yawning, facial flushing, perspiration, and the like). Other features may be associated with common gestures of a particular person, groups of people, and/or people in general. For instance, features may be associated with smiling (e.g., how long or frequently a person smiles), movement of eyebrows, hand gestures (e.g., gestures used with particular words or phrases), shoulder movement, and the like. Another class of features which may be used to detect synthetic media are speech characteristics. For instance, the particular words presented in media may be uncharacteristic for a particular person, a group of people, or people in general. Speech features such as measures of certain discourse markers (i.e., words such as "however" and "although" which are used to organize speech into different segments) and/or filler words (e.g., words such as "um" and "like") may be used to detect likely synthetic media.

Yet another class of features, referred to as "microexpressions" involve very brief (e.g., a fraction of a second) expressions which may be displayed involuntarily by a person in response to an emotion. For instance, a microexpression may be associated with a person attempting to conceal a specific emotion (e.g., a very brief expression may be displayed when an individual attempts to conceal a feeling of anger towards another). These gestures are often not recognized by humans and may be difficult or impossible to accurately reproduce in synthetic media. In some embodiments, the systems, devices, and methods described in this disclosure are configured to detect the absence of expected microexpressions in media in order to determine whether the media may be synthetic. As described further throughout this disclosure, any one or more of the features described above, or similar features, may be automatically measured in media (e.g., in a video) and used to determine whether the media is likely synthetic media.

This disclosure further encompasses the recognition that, features may be particular to specific person who is likely to be presented in synthetic media (e.g., a public figure). As such, characteristic ranges and/or values for features, such as those described above may be predetermined based on trusted media for a person of interest (e.g., a public figure). These characteristic ranges and/or values of features may be used as baseline features to compare to measured test features for media that is reviewed by the systems described in this disclosure. Also or alternatively, certain baseline features may be common to many people, such that previous information about a person presented in media is not required to detect synthetic media. Instead, the features determined from the media (e.g., rate of blinking, use of gestures, use of certain words, etc.) can be compared to shared baseline values to detect possible synthetic media. In some cases, different groups of people (e.g., people of different ages, people who speak different languages, etc.) may display different baseline features. For instance, certain hand gestures may be more common for individuals from a given group while they tend to be absent in individuals from another group. For instance, certain of the microexpressions described above may be common to a certain group of people while other microexpressions tend to be absent in that group.

As used in this disclosure, media generally refers to video, images, or audio content. However, media encompasses any other appropriate media which may be shared and/or distributed in a digital format. An example of media for a subject is a video of the subject speaking. As used in this disclosure, "real media" or "baseline media" refers to media that depicts (e.g., is a recording or other representation of) the subject without any adulteration to the information provided in the media. For example, a "baseline" video of a subject may include an audiovisual recording of the subject speaking. As used in this disclosure, "synthetic media" refers to media which has been edited to attribute actions and/or words to a subject which were not performed/spoken by the subject. For example, a "synthetic" video may include an edited version of a "real" or "baseline" recording of the image and audio of the subject speaking which has been edited to show the subject speaking words which were not actually spoken by the subject.

System for Synthetic Media Detection and Reporting

Figure 1:
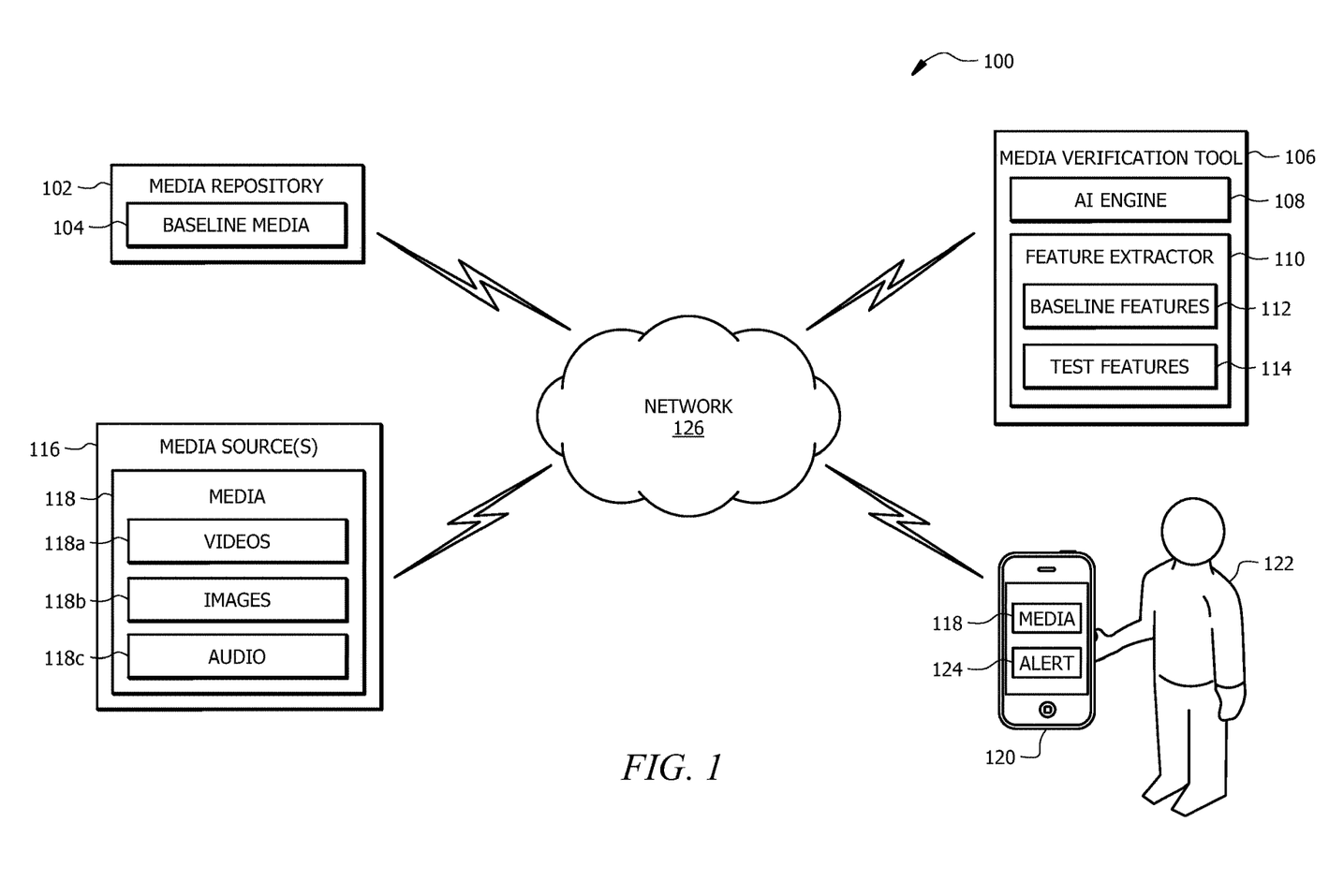
FIG. 1 is a schematic diagram of an example media verification system.

FIG. 1 is a schematic diagram of an example system 100 for determining whether media 118 is real or synthetic and report any detected synthetic media (e.g., as alert 124). The system 100 includes a media repository 102, a media verification tool 106, one or more media sources 116, a user device 120, and a network 126. As described in greater detail below and with respect to FIG. 2, the media verification tool 106 uses the baseline media 104 (i.e., videos, images, audio confirmed to be real) to determine baseline features 112, which generally include measures of the characteristics of the subject appearing in the baseline media 104 (e.g., a characteristic rate of blinking, etc.). The media verification tool 106 may then compare features 114 determined for media 118 for which verification is desired to baseline features 112 in order to determine whether the media 118 is synthetic media.

The media repository 102 is generally a data store, or database, operable to receive, store, and/or transmit baseline media 104. The baseline media 104 may include videos, images, audio recordings, and the like of known subjects (e.g., individuals). For instance, the baseline media 104 may include videos, images, and/or audio recordings which are confirmed to include one or more target subjects. For instance, a subset of the baseline media 104 may include videos of a predefined target subject (e.g., a person of interest such as a public figure). Another subset of the baseline media 104 may be associated with a particular group of subjects. Yet another subset of the baseline media 104 may not be associated with a specific person or subject but may instead represent an "average" subject. Such baseline media 104 may be associated with a random selection of people (e.g., and used to determine "shared" baseline features 112 for detecting synthetic media associated with an "average" group of subjects). Further examples of baseline media 104 and their relationship to different subjects and/or groups of subjects are described below with respect to FIG. 2. The media repository 102 may be operable to receive and/or transmit baseline media 104 to other components of the system 100 (e.g., via network 126). The media repository 102 may be implemented using the processor, memory, and interfaces of device 500 described with respect to FIG. 5 below.

The media verification tool 106 may be any computing device, or collection of computing devices, configured to receive baseline media 104 and media 118. The media verification tool 106 includes a feature extractor 110 and an artificial intelligence (AI) engine 108. As described in greater detail below with respect to FIG. 2, the feature extractor 110 is generally configured to determine, based on the baseline media 104, baseline features 112 for each subject, group of subjects, and/or for an average subjects. The baseline features 112 generally correspond to characteristics of the subject appearing in the baseline media 104. For example, the baseline features 112 may correspond to an average value and/or a range of expected values (e.g., a maximum and minimum value and/or an average and standard deviation value) for a particular subject, group of subjects, or a representative (e.g., "average") subject associated with the baseline media 104. The feature extractor 110 is also configured to determine test features 114 for other media 118 received from a media source 116. The test features 114 generally correspond to average values and/or ranges of values determined for given media being verified by the media verification tool 106.

For instance, a feature 112, 114 may be associated with autonomic features of the subject such as an average blinking frequency of the target subject in the media 104, 118, an average blinking time of the target subject in the media 104, 118 (i.e., the time during which eyes are closed when blinking), an average breathing rate of the target subject in the media 104, 118, an average time of each breath taken by the target subject in the media 104, 118, an amount of color change associated with flushing of the target subject in the media 104, 118, a timing of such color change in response to particular words spoken in the media 104, 118, timing and frequency of yawning by the target subject in the media 104, 118, and the like. Other features 112, 114 may be associated with common gestures of a particular person, groups of people, and/or people in general. For instance, features 112, 114 may be associated with smiling (e.g., how long or frequently a person smiles), movement of eyebrows, hand gestures (e.g., the rate at which particular gestures are used alone and/or in combination with particular words or phrases), the rate of shoulder movement, and the like. Other features 112, 114 may be associated with speech characteristics (e.g., the rate at which certain words appear in the media 104, 118, e.g., the rate at particular discourse markers such as "however" and "although" appear in the media 104, 118, the rate at which particular filler words such as "um" and "like" appear in the media 104, 118. Features 112, 114 may be related to the types and frequency of microexpressions appearing in the media 104, 118. The feature extractor 110 may employ any appropriate method of machine learning or artificial intelligence to determine features 112,114.

As described further with respect to the media verification tool 106 may determine, based on the baseline features 104, a baseline profile (e.g., profiles 206a-d of FIG. 2) for a given target subject or group of subjects, or a common profile shared by most subjects. A baseline profile for an individual subject generally includes for each baseline feature 104 a corresponding range of values that are common to this feature 104 for the particular subject (e.g., an average length of time that a given person tends to blink). A baseline profile for a group of subjects (e.g., for an average person) generally includes for each baseline feature 104 a corresponding range of values that are shared by most individuals (e.g., average length of time that most people tend to blink).

The artificial intelligence engine 108 is generally configured (e.g., "trained") to use the baseline features 104 to determine a confidence score (e.g., confidence score 230 of FIG. 2 described below) that any given media 118 is real. Generally, if the confidence score is below a threshold level (e.g., a threshold 306 as illustrated in FIG. 3), the media 118 is determined to be synthetic. Determination of confidence scores is described in greater detail below with respect to FIG. 2. In some embodiments, a single confidence score is determined for a given entry of media 118 that is reviewed by the media verification tool 106. In some embodiments, for instance, for video media 118a and/or audio media 118c, a confidence score may be determined over time, such that particular portions of the media 118 that are synthetic may be identified even if another portion of the media 118 is real (see FIG. 3 and corresponding description below). As an example, this may facilitate the identification of a portion of a video 118a of a press conference that is fake, even if a large portion of the press conference video 118a is real. The media verification tool 106 may provide the results indicating whether or not given media 118 is synthetic for display (e.g., as alert 124 on device 120 or any other appropriate device, a described below).

While certain functions are described in this disclosure as specifically being implemented by on or the other of the AI engine 108 or the feature extractor 110, it should be understood that in certain embodiments these functions may be interchangeably performed by either of the AI engine 108 or the feature extractor. Both the AI engine 108 and feature extractor 110 may employ any appropriate method of machine learning or artificial intelligence to implement their function(s). The media verification tool 106 may be implemented using the processor, memory, and interface of device 500 described with respect to FIG. 5 below.

The media source(s) 116 are generally sources (e.g., data repositories, computing devices, etc.) operable to receive, store, and/or transmit media 118, which may include, for example video media 118a, image media 118b, and audio media 118c. The video media 118a may include any type of video files (e.g., frames of images accompanied by audio). For instance, video media 118a may be an audiovisual recording of an individual speaking (e.g., at a press conference or the like). The image media 118b may include still images of a subject. For example, image media 118b may be photo of a subject. The audio media 118c may include audio recordings of a subject. For example, audio media 118c may be an audio recording of the same or different speech to that which accompanies the example video media 118a described above. Each of the media source(s) 116 may be implemented using the processor, memory, and interface of device 500 described with respect to FIG. 5 below.

The user device 120 is generally any computing device operable to receive the media 118 from the media source(s) 116 and present the media 118 for display to the user 122. For example, the device 120 may include a display for presenting the video media 118a and/or image media 118b. The device 120 may include one or more speakers for playing the audio portion of a video 118a and the audio media 118c. As described in greater detail below, a user device 120 may display media 118 to a user 122, and the user 122 may desire to know whether information presented in the media 118 is real or synthetic. The user device 120 may present an alert 124 for display which includes an indication of whether the media 118 is synthetic media. The user device 120 may be implemented using the processor, memory, and interface of device 500 described with respect to FIG. 5 below.

Figure 2:
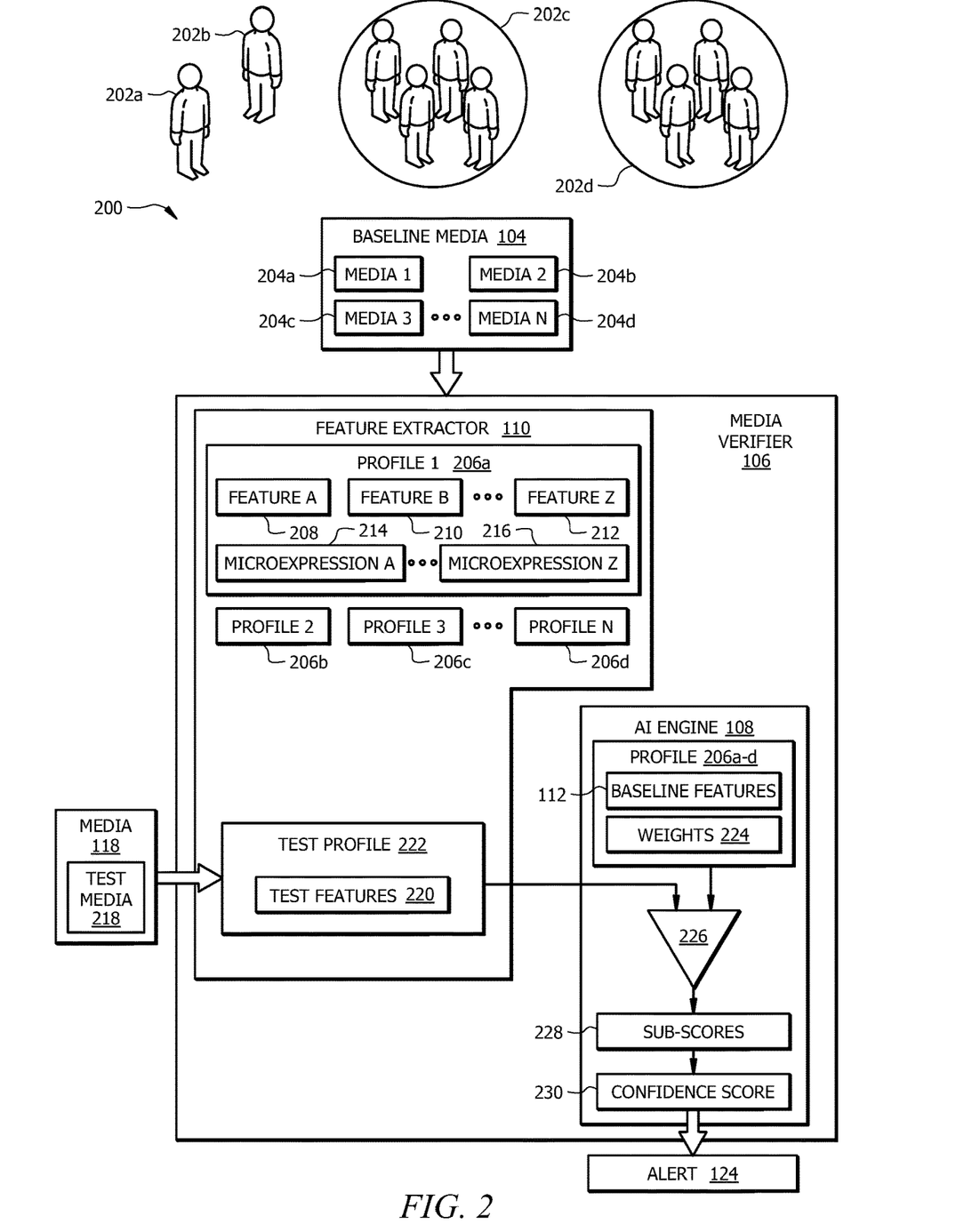
FIG. 2 is a flow diagram illustrating an example operation of the media verification tool of the system illustrated in FIG. 1.
Figure 3:
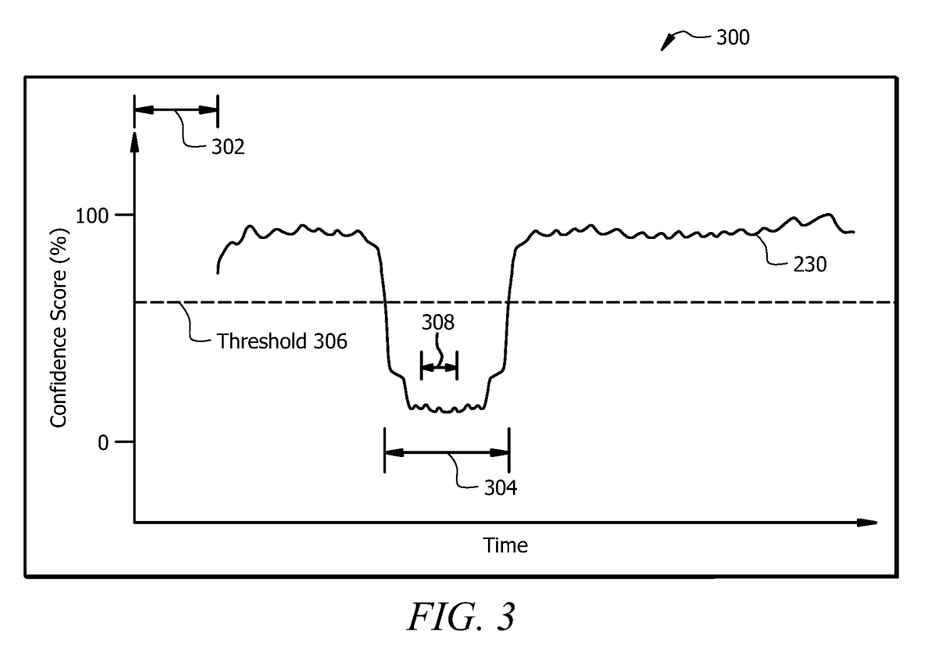
FIG. 3 is an example plot of confidence scores determined over time for an example test video determined using the media verification tool of the system illustrated in FIG. 1.

An example operation of the system 100 is illustrated in the flow diagram 200 of FIG. 2. As illustrated in FIG. 2, baseline media 104 is collected for subjects 202a-d. Baseline media 104 includes media 204a-d associated with corresponding subjects 202a-d. For instance, the media 204a-d may include a video and/or audio of the corresponding subjects 202a-d speaking and/or an image of the corresponding subjects 202a-d. In this example, subjects 202a and 202b are particular individuals. For instance, each of subjects 202a and 202b may be public figures for whom a bad actor may desire to create synthetic media to mislead media consumers (e.g., user 122 of FIG. 1). Subjects 202c are a group of subjects. Subjects 202c may be related by speaking the same language, being from the same region, or the like. As described above, in some cases, a group 202c of subjects (e.g., people from different regions and/or cultures, from a different age range, etc.) may display different baseline features 112. For instance, a group 202c of younger people may use different words when communicating (e.g., by using certain filler words such as "like" at an increased frequency). As described further below, baseline media 202c for the group of subjects 202c may capture features 206c of the group of subjects 202c. The group of subjects 202d generally represents an "average" person. For instance the group of subjects 202d may include a variety of individuals, such that the baseline media 204d collected for these subjects 202d should capture features 206d shared by most individuals.

The media verification tool 106 receives the baseline media, and the feature extractor 110 determines feature profiles 206a-d corresponding to each of the subjects 202a-d, respectively. The feature profiles 206a-d generally include baseline features 112 (see FIG. 1) for the corresponding subjects 202a-d. The feature extractor 110 may be configured to automatically review the baseline media 204a-d, extract baseline features 112 (see FIG. 1), and store these features 112 in the feature profiles 206a-d. Generally each of the feature profiles 206a-d may include any number of baseline features 112.

In the example of FIG. 2, the baseline features 208, 210, 212, 214, 216 stored in profile 206a for the first subject 202a (i.e., determined from baseline media 204a) are shown in more detail. As an example, the first feature 208 of the first subject 202a may be a rate of blinking (e.g., number of times the subject 202a is observed blinking per minute) determined from the baseline media 204a. The second feature 210 may be associated with a gesture characteristic (e.g., a rate at which hand gestures are used, a frequency of smiling, etc.) determined from the baseline media 204a. The third feature 212 may be associated with a speech characteristic (e.g., a rate at which particular discourse markers and/or filler words are used) determined from the baseline media 204a. The first microexpression feature 214 may be related to brief, involuntary expressions associated with movement of the eyes and/or eyebrows determined from the baseline media 204a. The second microexpression feature 216 may be brief, involuntary expressions associated with movement of the mouth determined from the baseline media 204a.

Each of the profiles 206b-d of the other subjects 202b-d may include the same or similar types of baseline features to those of features 208, 210, 212, 214, 216 described above and/or the baseline features 112 described above with respect to FIG. 1. The baseline profiles 206a-d may store average values and/or ranges of expected values (e.g., a maximum and minimum value and/or an average and standard deviation value) for the baseline features 208, 210, 212, 214, 216. The feature extractor 110 may employ any appropriate method of machine learning or artificial intelligence (e.g., k-nearest neighbor algorithm) to determine which features 208, 210, 212, 214, 216 to include in profile 206a and, optionally, how each feature 208, 210, 212, 214, 216 should be weighted for determining the confidence score 230, as described further below.

When the media verification tool 106 receives an entry of media 218 to test, the feature extractor 110 generally determines test features 220 for the media 218. The test features 220 generally include at least one of the same types of features 112 as those included in the baseline profiles 206a-d. The test features 220 may be combined into a test profile 222 which includes a collection of at least a portion of the determined features 220. The AI engine 108 uses the baseline profiles 206a-d to determine whether the test media 218 is real or synthetic media. The AI engine 108 includes a comparator 226 which compares the test profile 222 to the appropriate profile 206a-d and determines one or more confidence scores 230 for the test media 218, as described in greater detail below. In short, the AI engine 108 may determine, for each test feature 220 of the test profile 222, a corresponding sub-score 228. The sub-score 228 for each test feature 220 generally corresponds to a measure of a difference between a value associated with a test feature 220 and another value associated with the corresponding baseline feature 112. The confidence score 230 may be determined as an average of these sub-scores 228. As an example, if the test media 218 is known to be associated with a particular subject 202a,d and/or group of subjects 202c, the AI engine 108 may compare the test profile 222 to the baseline features 206a,b of the particular subject 202a,b and/or the baseline features 206c of the group 202c of subjects. In some embodiments, the test profile 222 is also compared to the baseline profile 206d of an "average" subjects 206d. Because a relatively large amount of baseline media 204d is generally available for average subjects 202d, these average baseline profile 206d may include additional useful information for detecting synthetic media (i.e., for determining reliable confidence scores 230). Generally, if the test media 218 is not associated with a particular subject 202a,d and/or group of subjects 202c, the AI engine 108 compares the test profile 222 to the baseline profile 206d of an "average" subjects 206d.

A confidence score 230 determined from the comparator 226 described above is generally a measurement of the probability that the test media 218 is real (e.g., a higher confidence score 230 correspondence to a higher probability that the test media 218 is real). In some embodiments, a confidence score 230 is determined as a function of time, such that particular portions of the test media 218 that are synthetic may be identified even if another portion of the media 218 is real. FIG. 3 is an example plot 300 of a confidence score 230 over time for a given entry of test media 218. In other words, the confidence scores 230 plotted over time in FIG. 3 represent confidence scores determined at different time points, or during different time intervals, associated with a video 118a or audio recording 118c. In this example, there is an initial time period 302 of the media 118 before which a confidence score 230 is not determined. After the initial time period 302, there may be sufficient information (e.g., a sufficient number of frames in a video 118a) to begin determining confidence scores 230. In plot 300, the confidence score 230 has a decreased value during a time interval 304. During this time interval 304, the test media 218 likely includes synthetic media. For instance, the test media 218 corresponding to the plot 300 may be a video 118a of a public figure speaking, and only the portion of the video 118a during time interval 304 may be synthetic media. The media verification tool 106 of this disclosure is configured to detect this portion of the media 218 that is synthetic. Generally, if a confidence score 230 is less than a threshold value 306, an alert 124 may be presented for display to the user 122 consuming the test media 218. In some embodiments, in order to reliably determine (e.g., with few or no false positive determinations) that the test media 218 is synthetic media, the confidence score 230 must fall below the threshold value 306 for at least a minimum period of time 308 before an alert 124 is provided.

In an example operation of the media verification tool 106 as illustrated in FIGS. 1 and 2, when a user 122 consumes (e.g., views, listens to, etc.) test media 218, the media verification tool 106 may automatically receive the media 218, determine a test profile 222 for the media 218, compare the test profile 222 for one or more profiles 206a-d that are relevant to the media 218, and calculate one or more confidence scores 230. For example, if the media 218 is known to be associated with one of the particular subjects 202a,b, the test profile 222 may be compared to the baseline profile 206a,b of that particular subject 202a,b. The media verification tool 106 may determine that the test media 218 is associated with a particular subject 202a,b or a particular group 202c of subjects based on a title, name, language, and/or location associated with the test media 218. For instance, if the test media 218 has a title and/or description that includes a name of a particular subject 202a,b or a particular group 202c of subjects, the test media 218 may be compared to the corresponding profile 202a-c. Generally, if the test media 218 is not associated with a particular subject 202a,b or a particular group 202c of subjects, the test profile 222 is compared to the average baseline profile 206d.

As an example, comparison of the test media profile 222 to the baseline profile 206a, by the comparator 226, may involve the comparison of individual baseline features 208, 210, 212, 214, 216 to corresponding test features 220 of the test profile 222. For instance, the comparator may determine whether a test feature 220 corresponding to the first feature 208 is within a threshold range of the first feature 208. For example, if the test features 220 include a blinking rate feature of five blinks per minute determined in the test media 218 and the corresponding first feature 208 indicates a blinking rate of twenty blinks per minute with a threshold range of plus or minus five blinks per minute, then the blinking rate-related test feature 220 is not within the threshold range of the corresponding baseline feature 208. The same or a similar comparison may be made between each of the features 220 identified in the test media 218 and the remaining features 210, 212, 214, 216 of the feature profile 206a to determine confidence score. The resulting confidence score 230 may be based on the number of test features 220 that fall within a threshold range of a corresponding baseline feature 208, 210, 212, 214, 216. For example, if the test features 220 for 80% for the baseline features 208, 210, 212, 214, 216 fall within a corresponding predetermined range for each feature 208, 210, 212, 214, 216, then the confidence score 230 may be 80%.

In some embodiments, the confidence score 230 may be determined based on a difference between a value associated with each test feature 220 and a value for the corresponding baseline feature 112. The difference values may correspond to quantifiable parameters such as rates of blinking, rates of breathing, the number of times certain keywords (e.g., discourse markers and/or filler words) are spoken, and the like. The AI engine 108 may also or alternatively be trained to detect certain difference values (e.g., related to the extent of similarity in the use of gestures in the test media 218 and the baseline media 204a-d). For the example case of a comparison between the test profile 222 and baseline profile 206a, a sub-score 228 may be determined based on the difference between each test feature 220 and the corresponding baseline feature 208, 210, 212, 214, 216. For example, a sub-score 228 may be 100% if a test feature 220 is equal to its corresponding baseline feature 208, 210, 212, 214, 216. The sub-score 228 may decrease as the difference between the test feature 220 and the corresponding baseline feature 208, 210, 212, 214, 216 increases. For instance, if a test feature 220 is 10% smaller than the corresponding baseline feature 208, 210, 212, 214, 216, the sub-score 228 for this test feature 220 may be 90%. In some embodiments, if the test feature 220 is greater than a threshold value higher or lower than the corresponding baseline feature 208, 210, 212, 214, 216, the sub-score 228 may be 0%. The confidence score 230 may be an average (e.g., a weighted average using the weights 224 described below) of the sub-scores 228 generated for each test feature 220 of the test profile 222.

In some embodiments, each baseline feature 112 may be associated with a corresponding weight 224, such that the impact of each baseline feature 112 on the determined confidence score 230 can be adjusted. For the example case of profile 206a, the first baseline feature 208 may have been determined to have a strong correlation with the presence of synthetic media for subject 202a, while feature 210 may have been determined to have a weaker correlation with the presence of synthetic media for subject 202a. As such, the first feature 208 may be assigned a larger weight 224 (e.g., of 0.9) and the second feature 210 may be assigned a smaller weight 224 (e.g., of 0.1), such that the resulting confidence score 230 is based to a greater extent on the first baseline feature 208 than the second baseline feature 210. These weights 224 may be used when averaging sub-scores 228 determined for the test features 220, as described above. In some embodiments, the confidence score 230 may be based at least in part on whether the test features 220 include each of the expected microexpressions 214, 216 for the profile 206a. If the test features 220 lack an expected microexpression 214, 216 for subject 202a, then the confidence score 230 may be in a range (e.g., below a threshold value), which indicates that the test media 218 is synthetic media. For instance, microexpression features 214, 216 may each be assigned weights 224 such that the absence of these features 214, 216 in the test features 220 results in a confidence score 230 that is less than a threshold value (e.g., threshold 306 of FIG. 3). As such, in some embodiments, if the test features 220 lack a microexpression corresponding to a microexpression feature 214, 216, then the media verification tool 106 may determine the test media 218 is synthetic media.

Example Detection of Synthetic Media

Figure 4:
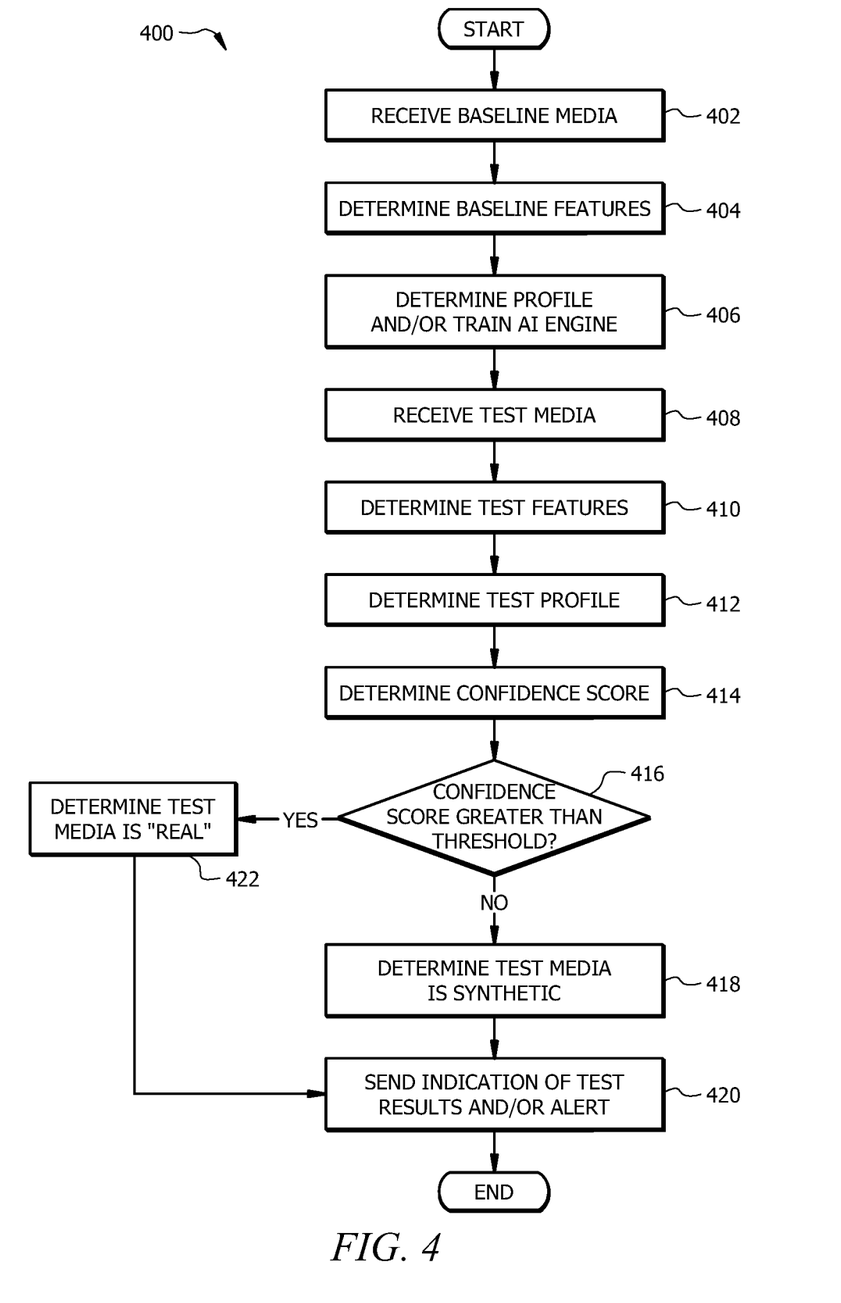
FIG. 4 is a flowchart illustrating an example method of detecting synthetic media using the system of FIG. 1.

FIG. 4 is a flowchart of an example method 400 for determining whether test media 218 is synthetic media. The media verification tool 106 of FIGS. 1 and 2 may implement method 400. The method 400 generally facilitates not only the detection of synthetic media but also the automatic reporting of the detected synthetic media to appropriate individuals (e.g., to a user 122 consuming the test media 118). Method 400 may begin at step 402 where the media verification tool 106 receives baseline media 104. For example, the media verification tool 106 may provide a request for baseline media 104 to media repository 104. In response to this request, the media repository 102 may provide the baseline media 104 to the media verification tool 106.

At step 404, the media verification tool 106 determines baseline features 112 for the received baseline media 104. For instance, the feature extractor 110 of the media verification tool 106 may employ a method of artificial intelligence to detect and/or determine the baseline features 112 associated with the baseline media 104. For instance, the feature extractor 110 may detect blinking in a video of a subject speaking and determine an average length of time associated with each blink and an average rate of blinking.

The determined baseline features 112 may correspond to an average value or a range of expected values (e.g., a maximum and minimum value and/or an average and standard deviation value) for a particular subject (e.g., subjects 202a,b of FIG. 2), group of subjects (e.g., subjects 202c of FIG. 2), or a representative (e.g., "average") subject (e.g., average subjects 202d of FIG. 2) associated with the baseline media 104.

At step 406, the media verification tool 106 determines at least one feature profile 206a-d using the baseline features 112. As described above with respect to FIG. 2, each feature profile 206a-d may be associated with a corresponding subject 202a-d. The feature profiles 206a-d generally include baseline features 112 (see FIG. 1) for the corresponding subjects 202a-d. In some embodiments, each baseline feature 112 may be associated with a corresponding weight 224, such that the impact of each baseline feature 112 on the determined confidence score 230 can be adjusted. In some cases, determining the feature profiles 206a-d corresponds to training an artificial intelligence model implemented by the media verification tool 106 to determine the confidence scores 230. As described above with respect to FIG. 1, the feature extractor 110 and/or the artificial intelligence engine 108 may implement any appropriate method of artificial intelligence, such as a k-nearest neighbor algorithm, to determine appropriate profiles 206a-d of baseline features 112 for detecting synthetic media.

At step 408, the media verification tool 106 receives media 118 to test (e.g., media 218 of FIG. 2). For example, the test media 118 may correspond to a video media 118a, image media 118b, and/or audio media 118c provided from a media source 116. The test media 118 may be particular media 118 that is being consumed by the user 122, as described above with respect to FIGS. 1 and 2. For instance, when a user 122 consumes (e.g., views, listens to, etc.) the test media 118, the media verification tool 106 may automatically receive the media 118. In some embodiments, the user 122 may request that the media verification tool 106 review the media 118 and provide an indication (i.e., alert 124) indicating whether the media 118 is determined to be real or synthetic.

At step 410, the media verification tool 106 determines test features 114 (e.g., features 220 of FIG. 2) for the test media 118. For example, the test features 114 may include the same features as those included in the baseline features 112. For example, the media verification tool 106 may identify portions of the test media 118 associated with blinking to determine features 114 associated with the length of eye blinking in the test media 118 and a frequency of eye blinking per time in the test media 118. Test features 114 associated with speech features (e.g., a rate at which particular discourse markers and/or filler words are used) may be determined using speech recognition tools and word frequency analysis. Certain test features 114 (e.g., related to the determination of features associated with gestures, the detection of particular microexpressions) may be determined using an appropriate method of artificial intelligence. For instance, the feature extractor 110 may be trained to detect and quantify certain features 114 in the test media 118.

At step 412, the media verification tool 106 determines a test profile (e.g., profile 222 of FIG. 2) based on the test features 114 (e.g., based on features 220 of FIG. 2). Determination of the test profile may involve combining the determined test features 114 from step 410. At step 414, the media verification tool 106 determines a confidence score 230 for the test media 118. The confidence score 230 may be determined using any one or more of the approaches described above with respect to FIGS. 1-3. In general, the confidence score 230 is based on the extent to which the test features 114 determined at step 410 are the same as or different than the baseline features 112 determined at step 404. In some embodiments, the media verification tool 106 may determine confidence scores 230 for the test media 118 over a period of time, as described above with respect to FIG. 3. The time-dependent confidence scores 230 may be used to determine a portion of the test media 118 that is synthetic media (e.g., during time interval 304 of FIG. 3) and/or to determine an overall confidence score 230 for the test media 118.

At step 416, the media verification tool 106 determines whether the confidence score 230 is greater than a threshold value (e.g., threshold 306 of FIG. 3 described above). If the confidence score 230 is not greater than the threshold value, the media verification tool 106 proceeds to determine the test media 118 is synthetic media at step 418. For instance, if a time-dependent confidence score 230 is less than a threshold value (e.g., threshold 306 of FIG. 3) for at least a threshold time (e.g., time interval 308 of FIG. 3), the media verification tool 106 may determine that the test media 118 is synthetic media at step 418. Otherwise, if the confidence score 230 is greater than the threshold value, the media verification tool 106 determines the test media 118 is real media at step 422.

At step 420, the media verification tool 106 provides an indication of the test results (i.e., from either step 418 or 422). For example, in the case where the media verification tool 106 determines the test media 118 is synthetic media at step 418, the results may be provided as alert 124 of FIG. 1, thereby informing user 122 that the test media 118 is synthetic. If, at step 418, the media verification tool 106 determined a portion of the test media 118 was synthetic media (e.g., portion corresponding to time interval 304 of FIG. 3), the alert 124 may identify this synthetic portion (e.g., corresponding to time interval 304 of FIG. 3). Similarly, results indicating the test media 118 is real from the determination at step 422 may be provided (e.g., to the user device 120 to inform the user 122 that the test media 118 is real).

Example Device for Synthetic Media Detection

Figure 5:
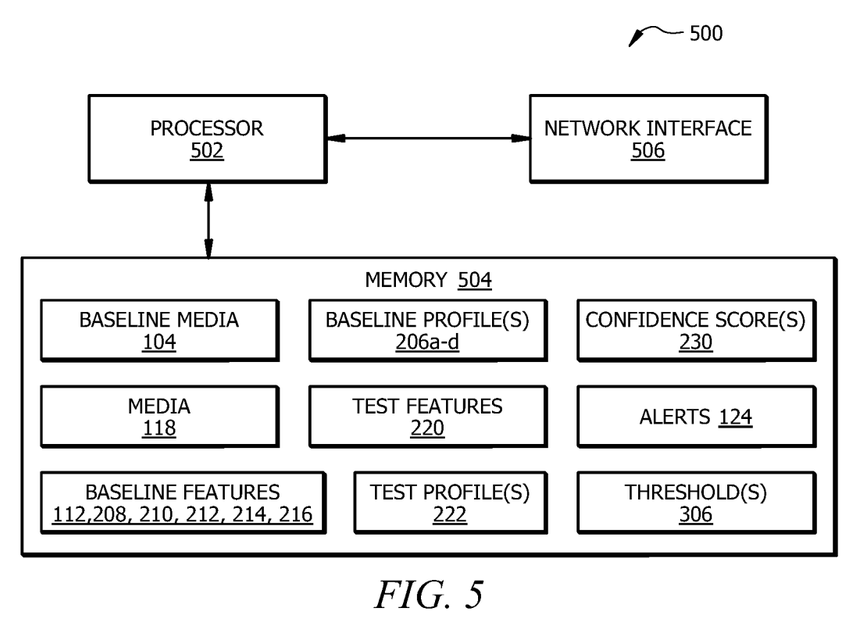
FIG. 5 is a diagram of an example device configured to implement the system of FIG. 1.

FIG. 5 is an embodiment of a device 500 configured to implement the system 100. The device 500 includes a processor 502, a memory 504, and a network interface 506. The device 500 may be configured as shown or in any other suitable configuration. The device 500 may be and/or may be used to implement the media repository 102, media verification tool 106, media source(s) 116, and user device 120 of FIG. 1.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504 and the network interface 506.

The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to the flow diagram 200 of FIG. 2 and method 400 of FIG. 4. In an embodiment, the function described herein is implemented using logic units, FPGAs, ASICs, DSPs, or any other suitable hardware or electronic circuitry.

The memory 504 is operable to store baseline media 104, media 118, 218, baseline features 112, 208, 210, 212, 214, 216, baseline profile(s) 206a-d, test features 114, 220, test profile(s) 222, confidence score(s) 230, alerts 124, threshold(s) 306, and any other data, instructions, logic, rules, or code operable to execute the function described herein. The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM).

The network interface 506 is configured to enable wired and/or wireless communications. The network interface 506 is configured to communicate data between the device 500 and other network devices, systems, or domain(s). For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a media server configured to store second baseline media for a target subject, the second baseline media comprising videos confirmed to include the target subject and to store baseline media for a group of subjects; and
a media verification device comprising:
a network interface coupled to the media server and configured to receive the baseline media;
a processor coupled to the network interface, the processor configured to:
determine, based on the baseline media, a set of features shared by the group of subjects;
determine an average-subject profile for the group of subjects based on the set of shared features, wherein the average-subject profile comprises for each feature of the set of shared features a corresponding range of values associated with the feature for the group of subjects;
the network interface further configured to receive test media, the test media comprising a video purported to include a test subject; and
the processor further configured to:
determine test features for the test media, the test features corresponding to characteristics of the test subject presented in the test media;
determine a test profile for the test media based on the set of test features, the test profile comprising at least a portion of the determined test features;
compare the test profile to the average-subject profile;
determine, based on the comparison of the test profile to the average-subject profile, a confidence score for the test media;
in response to determining that the confidence score is greater than a threshold value, determine that the test video of the test media is a real video;
in response to determining that the confidence score is not greater than the threshold value:
determine that the test media includes a synthetic video of the target subject; and
provide an alert identifying the test media as synthetic media.

2. The system of claim 1, wherein:
the network interface is further configured to receive the second baseline media; and
the processor is further configured to:
determine, based on the second baseline media for the target subject, a set of baseline features associated with the target subject, the baseline features corresponding to characteristics of the target subject presented in the second baseline media;
determine a baseline profile for the target subject based on the set of baseline features, wherein the baseline profile comprises for each baseline feature of the set of baseline features a corresponding range of values associated with the feature for the target subject;
compare the test profile to the baseline profile for the target subject;
determine, based on the comparison of the test profile to the baseline profile for the target subject, a second confidence score for the test media, the second confidence score comprising a probability that the test media includes synthetic media;
in response to determining that the second confidence score is greater than the threshold value, determine that the video of the test media is the real video of the target subject;
in response to determining that the second confidence score is not greater than the threshold value:
determine that the test media includes the synthetic video of the target subject; and
provide the alert identifying the test media as synthetic media.

3. The system of claim 2, wherein the baseline features comprise one or more of an average blinking frequency of the target subject in the second baseline media, an average blinking time of the target subject in the second baseline media, an average breathing rate of the target subject in the second baseline media, an amount of color change associated with flushing of the target subject in the second baseline media, a gesture performed by the target subject in the second baseline media, and a frequency at which one or more predetermined words are spoken by the target subject in the second baseline media.

4. The system of claim 2, wherein the baseline features comprise a microexpression displayed by the target subject in the second baseline media.

5. The system of claim 4, the processor further configured to:
determine that the microexpression is absent in the video of the test media;
in response to determining that the microexpression is absent in the test media:
determine that the test media includes the synthetic video of the target subject; and
provide the alert identifying the test media as synthetic media.

6. The system of claim 1, wherein:
the confidence score comprises a plurality of confidence scores determined over time, wherein each confidence score of the plurality of confidence scores is associated with a portion of the test video; and
the processor is further configured to:
determine, based on the plurality of confidence scores, one or more portions of the test video that is the synthetic video; and
provide a second alert identifying one or more portions of the test video that is the synthetic video.

7. The system of claim 2, the processor further configured to:
train an artificial intelligence engine to detect differences between the test features and corresponding baseline features; and
automatically determine the confidence score for the test media based on the detected differences using the artificial intelligence engine.

8. The system of claim 1, the processor further configured to provide the alert identifying the test media as synthetic media to a device on which the test media is being consumed.

9. A method comprising:
determining, based on baseline media for a group of subjects, a set of features shared by the group of subjects;
determining an average-subject profile for the group of subjects based on the set of shared features, wherein the average-subject profile comprises for each feature of the set of shared features a corresponding range of values associated with the feature for the group of subjects;
receiving test media, the test media comprising a video purported to include the test subject;
determining test features for the test media, the test features corresponding to characteristics of the test subject presented in the test media;
determining a test profile for the test media based on the set of test features, the test profile comprising at least a portion of the determined test features;
comparing the test profile to the average-subject profile;
determining, based on the comparison of the test profile to the average-subject profile, a confidence score for the test media;
in response to determining that the confidence score is greater than a threshold value, determining that the test video of the test media is a real video;
in response to determining that the confidence score is not greater than the threshold value:
determining that the test media includes the synthetic video of a target subject, wherein a second baseline media comprises videos confirmed to include the target subject; and
providing the alert identifying the test media as synthetic media.

10. The method of claim 9, further comprising: determining, based on the second baseline media for a target subject, a set of baseline features associated with the target subject, the baseline features corresponding to characteristics of the target subject presented in the second baseline media;
determining a baseline profile for the target subject based on the set of baseline features, wherein the baseline profile comprises for each baseline feature of the set of baseline features a corresponding range of values associated with the feature for the target subject;
comparing the test profile to the baseline profile for the test subject;
determining, based on the comparison of the test profile to the baseline profile for the test subject, a second confidence score for the test media, the second confidence score comprising a probability that the test media includes synthetic media;
in response to determining that the second confidence score is greater than the threshold value, determining that the video of the test media is the real video of the target subject;
in response to determining that the second confidence score is not greater than the threshold value:
determining that the test media includes the synthetic video of the target subject; and
providing an alert identifying the test media as synthetic media.

11. The method of claim 10, wherein the baseline features comprise one or more of an average blinking frequency of the target subject in the second baseline media, an average blinking time of the target subject in the second baseline media, an average breathing rate of the target subject in the second baseline media, an amount of color change associated with flushing of the target subject in the second baseline media, a gesture performed by the target subject in the second baseline media, and a frequency at which one or more predetermined words are spoken by the target subject in the second baseline media.

12. The method of claim 10, wherein the baseline features comprise a microexpression displayed by the target subject in the second baseline media, wherein the method further comprises:
  determining that the microexpression is absent in the video of the test media;
  in response to determining that the microexpression is absent in the test media:
    determining that the test media includes the synthetic video of the target subject; and
    providing the alert identifying the test media as synthetic media.

13. The method of claim 9, wherein:
  the confidence score comprises a plurality of confidence scores determined over time, wherein each confidence score of the plurality of confidence scores is associated with a portion of the test video; and
  the method further comprises:
    determining, based on the plurality of confidence scores, one or more portions of the test video that is the synthetic video; and
    providing a second alert identifying one or more portions of the test video that is the synthetic video.

14. The method of claim 10, the method further comprising:
  training an artificial intelligence engine to detect differences between the test features and corresponding baseline features; and
  automatically determining the confidence score for the test media based on the detected differences using the artificial intelligence engine.

15. The method of claim 9, the method further comprising providing the alert identifying the test media as synthetic media to a device on which the test media is being consumed.

16. A device comprising:
  a network interface coupled to a media server configured to store baseline media for a group of subjects, the network interface configured to receive the baseline media and second baseline media for a target subject, the second baseline media comprising videos confirmed to include the target subject;
  a processor coupled to the network interface, the processor configured to:
  determine, based on the baseline media, a set of features shared by the group of subjects;
  determine an average-subject profile for the group of subjects based on the set of shared features, wherein the average-subject profile comprises for each feature of the set of shared features a corresponding range of values associated with the feature for the group of subjects;
  the network interface further configured to receive test media, the test media comprising a video purported to include the test subject; and
  the processor further configured to:
  determine test features for the test media, the test features corresponding to characteristics of the test subject presented in the test media;
  determine a test profile for the test media based on the set of test features, the test profile comprising at least a portion of the determined test features;
  compare the test profile to the average-subject profile;
  determine, based on the comparison of the test profile to the average-subject profile, a confidence score for the test media;
  in response to determining that the confidence score is greater than a threshold value, determine that the test video of the test media is a real video;
  in response to determining that the confidence score is not greater than the threshold value: determine that the test media includes a synthetic video of the target subject; and
  provide an alert identifying the test media as synthetic media.

17. The device of claim 16, wherein:
  the processor is further configured to:
  determine, based on the second baseline media for the target subject, a set of baseline features associated with the target subject, the baseline features corresponding to characteristics of the target subject presented in the second baseline media;
  determine a baseline profile for the target subject based on the set of baseline features, wherein the baseline profile comprises for each baseline feature of the set of baseline features a corresponding range of values associated with the feature for the target subject;
  compare the test profile to the baseline profile for the target subject;
  determine, based on the comparison of the test profile to the baseline profile for the target subject, a second confidence score for the test media, the second confidence score comprising a probability that the test media includes synthetic media;
  in response to determining that the second confidence score is greater than the threshold value, determine that the video of the test media is the real video of the target subject;
  in response to determining that the second confidence score is not greater than the threshold value:
    determine that the test media includes the synthetic video of the target subject; and
    provide the alert identifying the test media as synthetic media.

18. The device of claim 17, wherein the baseline features comprise one or more of an average blinking frequency of the target subject in the baseline media, an average blinking time of the target subject in the baseline media, an average breathing rate of the target subject in the baseline media, an amount of color change associated with flushing of the target subject in the baseline media, a gesture performed by the target subject in the baseline media, and a frequency at which one or more predetermined words are spoken by the target subject in the baseline media.

19. The device of claim 17, wherein:
  the baseline features comprise a microexpression displayed by the target subject in the baseline media; and
  the processor further configured to:
    determine that the microexpression is absent in the video of the test media;
    in response to determining that the microexpression is absent in the test media:
      determine that the test media includes the synthetic video of the target subject; and
      provide the alert identifying the test media as synthetic media.

20. The device of claim 16, wherein:
  the confidence score comprises a plurality of confidence scores determined over time, wherein each confidence score of the plurality of confidence scores is associated with a portion of the test video; and
  the processor is further configured to:

determine, based on the plurality of confidence scores, one or more portions of the test video that is the synthetic video; and provide a second alert identifying one or more portions of the test video that is the synthetic video.

* * * * *